US012187577B2

(12) United States Patent
Kusserow et al.

(10) Patent No.: US 12,187,577 B2
(45) Date of Patent: Jan. 7, 2025

(54) METHOD AND DEVICE FOR DETERMINING A MAPPING OF A NUMBER OF FLOORS TO BE SERVED BY AN ELEVATOR AND FOR DETERMINING RELATIVE TRIP-DEPENDENT DATA OF AN ELEVATOR CAR

(71) Applicant: Inventio AG, Hergiswil (CH)

(72) Inventors: Martin Kusserow, Lucerne (CH); Michael Guarisco, Zürich (CH); Zack Zhu, Baar (CH)

(73) Assignee: INVENTIO AG, Hergiswil (CH)

( * ) Notice: Subject to any disclaimer, the term of this patent is extended or adjusted under 35 U.S.C. 154(b) by 1204 days.

(21) Appl. No.: 16/761,511

(22) PCT Filed: Jan. 11, 2019

(86) PCT No.: PCT/EP2019/050632
§ 371 (c)(1),
(2) Date: May 5, 2020

(87) PCT Pub. No.: WO2019/141598
PCT Pub. Date: Jul. 25, 2019

(65) Prior Publication Data

US 2021/0371233 A1 Dec. 2, 2021

(30) Foreign Application Priority Data

Jan. 22, 2018 (EP) .................................... 18152811

(51) Int. Cl.
*B66B 1/34* (2006.01)
*B66B 1/30* (2006.01)

(52) U.S. Cl.
CPC .............. *B66B 1/3492* (2013.01); *B66B 1/30* (2013.01)

(58) Field of Classification Search
CPC ................................ B66B 1/3492; B66B 1/30
See application file for complete search history.

(56) References Cited

FOREIGN PATENT DOCUMENTS

| | | | |
|---|---|---|---|
| CN | 102009883 | B | 12/2012 |
| CN | 104955756 | A | 9/2015 |
| CN | 105293223 | A | 2/2016 |
| CN | 105712142 | A | 6/2016 |

(Continued)

*Primary Examiner* — Jeffrey Donels
(74) *Attorney, Agent, or Firm* — William J. Clemens; Shumaker, Loop & Kendrick, LLP

(57) ABSTRACT

A method for determining a mapping of a number of floors to be served by an elevator includes the steps of: (a) determining, during a multiplicity of trips of an elevator car of the elevator, a trip-dependent physical parameter value which unambiguously depends on at least one of a trip duration and a trip distance; and (b) clustering the determined trip-dependent physical parameter values to clusters to define each of the floors in the mapping. In a training phase, the method automatically determines the number of floors served and then, in an operation phase, classifies each of the observed trips and finally detects and tracks a current position of the elevator car. An elevator monitoring device implementing such method may be retrofitted into existing elevators for e.g. remotely monitoring the elevator operation and does not necessarily require any data transfer between components of the elevator and the elevator monitoring device.

19 Claims, 4 Drawing Sheets

(56) References Cited

FOREIGN PATENT DOCUMENTS

| | | | | | |
|---|---|---|---|---|---|
| CN | 107423412 | A | | 12/2017 | |
| CN | 107522052 | A | * | 12/2017 | ............ B66B 5/021 |
| EP | 3002245 | A2 | | 6/2016 | |
| WO | 2014082258 | A1 | | 6/2014 | |

* cited by examiner

23 CLUSTERING PROCEDURE
25 SORTING PROCEDURE
27 CLASSIFIER
29 POSITIONER PHASE

METHOD AND DEVICE FOR DETERMINING A MAPPING OF A NUMBER OF FLOORS TO BE SERVED BY AN ELEVATOR AND FOR DETERMINING RELATIVE TRIP-DEPENDENT DATA OF AN ELEVATOR CAR

FIELD

The present invention relates to a method and a device for determining a mapping of a number of floors to be served by an elevator, i.e. for providing map-like information about a plurality of floors at which an elevator car of the elevator may stop. Furthermore, the present invention relates to a method and a device for determining relative trip-dependent data of an elevator car upon the elevator car being displaced between various floors. From such trip-dependent data, for example an information about a current position of the elevator car may be derived. Additionally, the present invention relates to a computer program product and a computer-readable medium storing such computer program product.

BACKGROUND

Elevators serve for transporting passengers or items between various levels within a building. The levels shall generally be referred to herein as floors. Typically, an elevator car may travel vertically along an elevator shaft and may stop at each of the floors. An elevator operation controller controls a motion of the elevator car by suitably controlling a drive engine. For such purpose, the elevator operation controller typically obtains information about a number and position of floors to be served and/or about a current position of the elevator car such that the elevator car may be correctly moved throughout the elevator shaft and may be precisely stopped at an intended floor.

Various approaches have been developed for determining information about a current position of the elevator car in the elevator shaft.

For example, specific infrastructure such as machine-detectable identifiers may be mounted in the elevator shaft at each of the floors, each identifier identifying an identity and/or position of the associated floor. A sensor may be arranged at the elevator car, this sensor reading the identification information from an associated one of the identifiers upon approaching one of the floors. Such information may e.g. be transmitted to the elevator operation controller.

Alternatively, the position of the elevator car may be determined using an acceleration sensor and/or an air pressure sensor, as described e.g. in EP 3 002 245 A2.

As a further alternative, the position of the elevator car may be determined by suitably detecting an initial floor and then detecting motions relative to this initial floor, as described e.g. in CN 105293223 A.

Such conventional approaches typically require that either specific infrastructure is fixedly installed within the elevator shaft at predetermined positions. Or, alternatively, such conventional approaches require that an option for measuring absolute position data is provided. I.e. either absolute physical parameter values relating to the current position are measured or physical parameter values are measured which allow determining a relative motion of the elevator car with respect to a known absolute position or reference.

However, there may be applications where both such conventional approaches may not be easily implemented. For example, it may be intended to monitor motions of an elevator car in an elevator shaft where neither positioning infrastructure is accessible nor any information for acquiring absolute positioning data is available. Such example may apply e.g. in cases where an existing elevator shall be retrofitted such that its operation and motions of its elevator car may be monitored. In some cases, even a number of floors to be served by an elevator is not known a priori. Particularly, remote monitoring of elevator activities may be desired. For example, a monitoring service provider may require monitoring elevator operations from a remote control center, but the monitoring provider is not the manufacturer of the elevator or for other reasons has no precise knowledge about the infrastructure of the elevator and/or data flows within the elevator.

Accordingly, there may be a need for options enabling to provide information about a number of floors to be served by an elevator and/or enabling to provide information about motions of the elevator car throughout the elevator shaft. Particularly, such options should be technically simple and cost effective, devices for implementing the options should be simple to install and/or the information should be simple and reliable to evaluate.

SUMMARY

Such needs may be met with the subject-matter of the advantageous embodiments defined in the following specification.

According to a first aspect of the present invention, a method for determining a mapping of a number of floors to be served by an elevator is proposed. The method comprises at least the following steps, preferably in the indicated order: (i) determining, during a multiplicity of trips of an elevator car of the elevator, a trip-dependent physical parameter value which unambiguously depends on at least one of a trip duration and a trip distance; and (ii) clustering the determined trip-dependent physical parameter values to define each of the number of floors in the mapping.

According to a second aspect of the present invention, a method for determining relative trip-dependent data of an elevator car is proposed. The method comprises at least the following steps, preferably in the indicated order: (i) determining a trip-dependent physical parameter value which unambiguously depends on at least one of a trip duration and a trip distance; (ii) classifying the determined trip-dependent physical parameter value to exactly one trip between floors defined in a mapping of the number of floors to be served by the elevator, the mapping being determined using a method according to an embodiment of the first aspect of the invention; and (iii) determining the relative trip-dependent data of the elevator car based on the classification.

According to a third aspect of the present invention, an elevator monitoring device for determining a mapping of a number of floors to be served by an elevator and/or for determining relative trip-dependent data of an elevator car is proposed. The device is configured for performing and/or controlling a method according to an embodiment of the first or second aspect of the invention.

According to a fourth aspect of the present invention, a computer program product comprising computer readable instructions is proposed, which, when performed by a processor of an elevator monitoring device, instruct the elevator monitoring device to perform and/or control the method according to an embodiment of the first or second aspect of the invention.

According to a fourth aspect of the present invention, a computer readable medium is proposed, the medium comprising stored thereon a computer program product according to an embodiment of the fourth aspect of the invention.

Ideas underlying embodiments of the present invention may be interpreted as being based, inter alia and without restricting a scope of the invention, on the following observations and recognitions.

Embodiments of the present invention enable automatically determining a number of floors served by an elevator and/or determining information about trips of the elevator car between floors and/or information about a current position of the elevator car. Particularly, a mapping of the number of floors may be provided with simple technical means and generally without a necessity of infrastructure being fixedly installed in the elevator or information provided by components of the elevator.

Instead, the proposed method and elevator monitoring device may preferably be implemented with an independent and technically simple unit which may be e.g. retrofitted in an existing elevator, without necessarily requiring any data connectivity to components of the elevator such as its position determination system and/or its operation controller controlling the drive engine. Particularly, the method and elevator monitoring device may be applied in existing elevators which are e.g. to be remotely monitored and for which no information about a number of floors and/or about a current position of the elevator car may be easily acquired.

Summarized, embodiments of the proposed method and device may enable determining information about the number of floors to be served by an elevator, information about trips of the elevator car between floors and/or information about a current position of the elevator car using a statistical approach as follows:

During a learning phase including a multiplicity of trips of the elevator car, trip-dependent physical parameter values are determined, i.e. values of a physical parameter are determined wherein these values vary depending on characteristics of the associated trip of the elevator car. The trip-dependent physical parameter values may be directly measured or may be derived from other sources of knowledge. For example, the trip-dependent physical parameter values may be measured using a measuring device such as a sensor or detection device. The measuring device may be installed or arranged at or in the elevator car. Alternatively, the trip-dependent physical parameter value may be derived e.g. from a knowledge source such as an elevator operation controller providing data e.g. representing operation of a drive engine.

The trip-dependent physical parameter values may vary depending on features of a trip of the elevator car, i.e. depending on a phase between a start of a car motion and an end of the car motion. Particularly, the trip-dependent physical parameter values unambiguously depend on the duration of a trip, i.e. the time the elevator car needs to be moved between two stops, and/or on the distance of a trip, i.e. the distance between two stops. In other words, a physical parameter value is determined which directly corresponds to a single value of a trip duration and/or of a trip distance. For example, the trip duration may be measured as the duration between two triggering events or the trip distance may be measured as the distance travelled in the time between two triggering events. The trip-dependent physical parameter values may be determined continuously or repeatedly in suitable time periods of e.g. between 0.1 s and 10 s.

It may be sufficient to determine a single type of trip-dependent physical parameter. For example, only the trip duration or a physical parameter directly and unambiguously correlating with the trip duration may be determined. Alternatively, only the trip distance or a physical parameter directly and unambiguously correlating with the trip distance may be determined. As a further alternative, it may be beneficial to determine two different trip-dependent physical parameters. For example, both the trip duration and the trip distance, or respective correlating parameters, may be determined and both types of trip-dependent physical parameter values may be used upon statistically determining the mapping of the number of floors.

After having acquired a sufficient number of determinations of trip-dependent physical parameter values, these trip-dependent physical parameter values are submitted to a clustering procedure. Such clustering is performed such as to determine each of the number of floors in the mapping. The clustering procedure includes those parameter values which are sufficiently close to each other or sufficiently close to an average value from a cluster representative, i.e., are members of a cluster unit. Thus, each cluster of parameter values is attributed to one floor out of the multiplicity of floor served by the elevator. Accordingly, the number of clusters obtained in the clustering procedure corresponds to the number of possible trips or number of floors served by the elevator minus one.

This statistical approach relies on the assumption that during elevator operation, multiple elevator trips of different lengths and durations occur. However, the trip distances and durations are not arbitrary but result from the distance intervals between floors. In other words, as the elevator car generally travels between two of the served floors, there is a number of distinct trip distances corresponding to distinct trip durations. Of course, due to slight variations e.g. in a speed curve of the car, some variations may occur such that not each one of the trips includes one of a limited number of trip distances and trip durations. However, all trips corresponding to a specific trip type between two floors having a specific actual distance in between will reveal a measured trip distance or trip duration plus/minus some tolerance. Accordingly, the measured trip distances and/or trip durations associated to this trip type will be sufficiently similar to each other to be clustered to one cluster. Thus, as during a sufficiently long operation period of the elevator, all possible trips and trip distances will occur several times, the clustering procedure allows determining clusters of parameter values and each cluster relates to one possible trip distance. In the end, the number of observed possible trip distances corresponds to the number of accessible floors minus one. I.e. by clustering the trip-dependent physical parameter values, the number of floors served by the elevator may be unambiguously determined.

According to an embodiment, the clustering is performed using a density-based clustering algorithm.

A density-based clustering algorithm may be implemented for example using a Density-Based Spatial Clustering of Applications with Noise (DBSCAN) technique. Given a set of points in some space such as a parameter space, a density-based clustering algorithm groups together points that are closely packed together, i.e. points with many nearby neighbors. Outlier points that lie alone in low-density regions, i.e. whose nearest neighbors are too far away, may be marked and such points may be interpreted as noise and may be ignored or separately returned. A basic idea of this algorithm relies in a so-called density relatedness. Therein, two objects are deemed to be density-related if there is a chain of dense objects that connect these points with each other. The objects which are connected with each other via the same core objects form a cluster. Objects which are no member of a density-related cluster are interpreted as noise.

Density-based clustering algorithms may be implemented in hardware, software or a combination of both.

When applied to an embodiment of the method described herein, a density-based clustering algorithm may be used to cluster objects which are formed by the previously determined trip-dependent physical parameter values. For example, parameter values unambiguously relating to the duration of an elevator trip may be acquired for a sufficiently large variety of trips and, subsequently, these parameter values may be grouped such as to form clusters of closely neighboring parameter values. Each cluster obtained by such density-based clustering generally represents one type of possible trips between floors served by the elevator. For example, one type of trip represents those trips where the car travels from one floor to the closest neighboring floor, another type of trip represents those trips where the car travels from one floor to a next but one floor, and so on. Accordingly, the number of clusters corresponds to the number of served floors minus one.

Generally, the trip-dependent physical parameter values may be measured, acquired or determined using a variety of techniques implemented for example in sensors or detectors. For example, there is a multiplicity of sensors allowing detecting physical parameter values unambiguously relating to a trip distance. As an example, laser-based distance measuring devices may be used for measuring distances travelled by an elevator car during a trip. Such a laser-based distance measuring device may be mounted for example on the car and may measure a current distance to a top or bottom of the elevator shaft. There is also a multiplicity of sensors allowing detecting physical parameter values unambiguously relating to a trip duration, such sensors typically include a clock or chronometer which may be triggered by some internal or external signal.

There are some approaches for measuring the trip-dependent physical parameter values which are particularly beneficial.

For example, according to an embodiment, the trip-dependent physical parameter values may be measured using an acceleration sensor.

Acceleration sensors may be implemented as micro-electronic devices and/or micro-mechanic devices and may be provided at low costs. Acceleration sensors may measure accelerations with high precision and high reliability.

For an application in the method and device proposed herein, an acceleration sensor measuring accelerations only in one direction, i.e. a one-dimensional acceleration sensor, may be sufficient as the elevator car generally travels along a one-dimensional path. However, also more-dimensional acceleration sensors may be used. An acceleration sensor may be mounted to the elevator car and may then measure accelerations acting onto the travelling car. Based on such measured acceleration values, trip-dependent physical parameter values unambiguously relating to the trip duration and/or the trip distance may be easily determined.

For example, according to a specific implementation of the preceding embodiment, a beginning of the at least one of a trip duration and a trip distance may be triggered upon a physical parameter value relating to a measured acceleration exceeding a first threshold value and an end of the at least one of a trip duration and a trip distance may be triggered upon a physical parameter value relating to a measured acceleration falling below a second threshold value after exceeding a third threshold value.

In other words, the beginning and the end of an elevator trip may be determined based on the acceleration values measured by the acceleration sensor. Having determined the beginning and end as triggering signals, the duration between these triggering signals may be easily measured using for example a chronometer integrated into the acceleration sensor. Additionally or alternatively, the distance travelled during the trip may be easily obtained for example by double integration of the acceleration values during the trip, i.e. from the beginning to the end of the trip.

Generally, at the beginning of an elevator trip, the elevator car is accelerated in one direction. The acceleration sensor may sense such acceleration and may interpret such acceleration as a beginning of a trip in case the acceleration exceeds the first threshold value. In such a case, the first threshold value should be set such that, on the one hand, accelerations typically occurring upon beginning a trip are reliably detected but, on the other hand, minor accelerations acting onto the elevator car for example upon passengers entering or leaving the car are not mistaken as indicating elevator trips.

In an alternative approach, the acceleration values are not directly taken for determining a triggering event but, instead, a gradient of such measured acceleration values is determined. Therein, for example when a quick increase of an acceleration is detected and therefore a large acceleration gradient exceeds a threshold value, this is interpreted as representing the beginning of an elevator trip.

In a further alternative approach, the acceleration values are again not directly taken for determining a triggering event but, instead, a duration during which such acceleration is detected is determined. In case such a duration of such an acceleration pattern exceeds a threshold value, i.e. in case the elevator car is accelerated for a sufficiently long time, this is interpreted as representing the beginning of an elevator trip. In contrast hereto, accelerations acting only for very short times may be ignored as they typically do not occur upon starting an elevator trip but upon for example passengers entering or leaving the elevator car.

In a deceleration phase at the end of an elevator trip, the elevator car is again accelerated. An exceedance of a third threshold by the acceleration may indicate the beginning of the deceleration phase. However, this final acceleration occurs in an opposite direction as compared to the beginning of the elevator trip, i.e. it may be interpreted as a negative acceleration or deceleration. Such deceleration may again be measured using the acceleration sensor. After the beginning of the deceleration phase such deceleration may indicate the end of the elevator trip upon the measured deceleration falling below a second threshold value. Such second and third threshold values generally are of opposite sign compared to the first threshold value.

As alternative approaches, again the deceleration gradient or the deceleration duration may be taken as indicating the end of the elevator trip upon exceeding a predetermined second threshold value.

According to another embodiment, the trip-dependent physical parameter values may be measured using an air pressure sensor.

Air pressure sensors may be implemented as micro-electronic devices and/or micro-mechanic devices and may be provided at low costs. Air pressure sensors may measure a pressure or pressure variations in ambient air with high precision and high reliability.

For an application in the method and device proposed herein, an air pressure sensor may measure the local air pressure which generally varies depending on an altitude. An air pressure sensor may be mounted to the elevator car and may then measure the pressure of the air next to the elevator car. The measured air pressure generally depends on the current location of the elevator car, i.e. on the current altitude of the elevator car. Since only air pressure differences are considered additional dependencies of the air pressure i.e. on the current weather are not critical. Based on such measured air pressure values, trip-dependent physical parameter values unambiguously relating to the trip duration and/or the trip distance may be easily determined.

For example, according to a specific implementation of the preceding embodiment, a beginning of the at least one of a trip duration and a trip distance may be triggered upon a physical parameter value relating to a gradient of a measured air pressure exceeding a first threshold value and an end of the at least one of a trip duration and a trip distance is triggered upon a physical parameter value relating to the gradient of the measured air pressure falls below a second threshold value.

Generally, the air pressure measured by the sensor falls upon the elevator car together with the air pressure sensor climbing upwards within the elevator shaft and the measured air pressure rises upon the elevator car travelling downwards. In other words, the measured air pressure is generally reciprocal to the current altitude. However, the air pressure not only depends on the current altitude of the elevator car but also on other parameters such as e.g. the varying weather conditions. Accordingly, measurements of the air pressure generally may not be directly used for indicating the beginning or the end of an elevator trip. However, while air pressure variations due to other influences such as weather variations generally occur slowly, air pressure variations due to varying altitudes of a travelling elevator car may occur on short timescales. Accordingly, physical parameter values relating to a gradient of a measured air pressure may reliably indicate a beginning and/or an end of an elevator trip.

For example, when the measured air pressure begins to quickly decrease, this may be taken as indicating the beginning of an elevator trip in an upwards direction and when the measured air pressure stops to quickly decrease, this may be taken as indicating the end of such an elevator trip. Similarly, a quickly increasing measured air pressure may indicate the beginning of an elevator trip in a downward direction and the end of such quick air pressure increase may indicate the end of the elevator trip.

In order to enable distinguishing between rapid air pressure variations occurring due to elevator trips and slower air pressure variations occurring due to other reasons, only physical parameter values relating to a gradient of the measured air pressure exceeding a first and second threshold, respectively, should be taken as indicating the beginning and end, respectively, of an elevator trip. Therein, the first and second thresholds may be of a same or of different magnitudes.

According to an embodiment, a trip distance may be determined by double integration of measured acceleration values.

In other words, an acceleration sensor may be used for measuring trip-dependent physical parameters relating to accelerations acting onto the elevator car. Having measured such accelerations during an elevator trip, the distance travelled by the elevator car during this trip may be easily calculated by double integration of the measured acceleration values. Therein, the first integration of the acceleration values provides values for a current velocity and the second integration provides a value for the distance of the trip. The beginning and the end of the trip may be determined upon a physical parameter value relating to a measured acceleration as measured by the acceleration sensor exceeding respective threshold values, as indicated above. Alternatively, the beginning and the end of the trip may be determined upon a physical parameter value relating to measured air pressure gradients measured by an air pressure sensor exceeding respective threshold values, as indicated later above. Further alternative approaches may be used for determining the beginning and the end of the trip. The process of integrating the measured acceleration values may be implemented within the acceleration sensor. Alternatively, the acceleration sensor may provide its measured values to an external evaluation unit and this evaluation unit may perform the integration process.

According to an alternative embodiment, a trip distance is determined based upon a pressure difference between air pressures measured at a beginning and at an end of an elevator trip.

In other words, an air pressure sensor may be used for measuring trip-dependent physical parameters relating to air pressures prevailing in an ambience of the elevator car. During an elevator trip, such air pressures vary depending on the current altitude of the elevator car. Accordingly, upon measuring the air pressure at the beginning of a trip and measuring the air pressure at the end of the trip, the difference between these air pressure measurements may be easily used for calculating the difference in altitude travelled during the elevator trip. Therein, the beginning and the end of the trip may be determined either upon a physical parameter value relating to a measured acceleration as measured by an acceleration sensor exceeding respective threshold values, as indicated above, or upon a physical parameter value relating to measured air pressure gradients measured by the air pressure sensor exceeding respective threshold values, as indicated later above, or in accordance with another approach. The process of calculating differences in air pressure values may be implemented within the air pressure sensor. Alternatively, the air pressure sensor may provide its measured values to an external evaluation unit and this evaluation unit may perform the calculation process.

According to an embodiment, a beginning of the at least one of a trip duration and a trip distance is triggered based on a measurement of a first physical parameter value and the trip-dependent physical parameter value is determined based on a measurement of a second physical parameter value.

In other words, it is assumed to be beneficial to base the triggering of the beginning of a measurement for determining a trip-dependent physical parameter value on a measurement of a first physical parameter value, this first physical parameter value being different from a second physical parameter value which is measured in order to determine the trip-dependent physical parameter value itself. Accordingly, the triggering of a measurement is decoupled from the measurement itself as the triggering is based on the measurement of another physical parameter value than the physical parameter values to be measured in the actual triggered measurement. Due to such decoupling, the entire procedure of determining the trip-dependent physical parameter values may be made more robust.

For example, the first physical parameter value may be an ambient air pressure at the elevator car's altitude and the second physical parameter value may be an acceleration of the elevator car. In such a case, the beginning of an elevator trip may be detected based on the detected rapid change of the air pressure, i.e. the air pressure gradient exceeding a threshold value. After having detected such beginning of the elevator trip, the actual measurement of the trip-dependent physical parameter value is triggered and the accelerations occurring after such a beginning of the trip are detected, optionally recorded and finally integrated twice in order to obtain e.g. information about a distance travelled during such trip.

After the mapping of the number of floors to be served by the elevator has been determined in a learning phase using the methods described herein, this information may be subsequently used in an operation phase upon determining relative trip-dependent data relating to motions of the elevator car in accordance with the second aspect of the invention. The relative trip-dependent data may comprise for example information about the number of floors travelled during a trip. Therein, during the operation phase, trip-dependent physical parameter values are determined in a similar way as during the learning phase. However, in this case, the determined trip-dependent physical parameter values do no more have to be submitted to a clustering procedure. Instead, each of the determined trip-dependent physical parameter values is classified to exactly one of the floors defined in the mapping of the number of floors to be served by the elevator. Based on such classification, the required relative trip dependent data may then be determined.

For example, for each of multiple trips of the elevator car during the operation phase, a trip duration, a trip distance or any trip-dependent physical parameter value depending therefrom may be measured or acquired. At such operation phase, a mapping of the number of floors to be served by the elevator already exists, i.e. there is already information available for example about the number of served floors as well as spacings between floors in terms of trip distance or trip duration.

Taking into account such an existing mapping, the trip-dependent physical parameter value as determined for a trip during the operation phase may be compared with the information comprised in the mapping and may be classified, i.e. may be attributed, to exactly one trip out of the plurality of possible trips between floors identified in the mapping. Therein, the determined trip-dependent physical parameter value for each of the trips performed by the elevator car will be classified to one of the existing options of trips included in the previously defined mapping of floors. In other words, while, during the learning phase, trips are only associated to a cluster in case their measured trip duration or trip distance are sufficiently close to other trips and trips not fulfilling this requirement are disregarded, during the operation phase, all trips are classified to exactly one of the possible trips defined in the previously acquired mapping.

The classification procedure may use various classification algorithms. For example, a Bayes classification or Naïve Bayes classification may be applied. In such classification, a classifier is generated based on the Bayes theorem. As an alternative, the classification procedure may use a k-nearest neighbor (KNN) classifier.

According to an embodiment of the method of the second aspect of the invention, the method further comprises a step of tracking the relative trip-dependent data such as to determine whether the elevator car has travelled along all of the number of floors in a consecutive order and setting an initial car position information of the elevator car to one of an uppermost and a lowermost floor of the number of floors, depending on a travelled direction.

In other words, during the operation phase, the relative trip-dependent data acquired for each of the trips of the elevator car are continuously or repeatedly monitored and tracked. For example, it is tracked how many of the existing floors are bridged during one elevator trip. Furthermore, a direction of the trip is tracked. Such tracking allows detecting whether the elevator car has travelled along all of the number of floors indicated in the mapping of the floors in a consecutive order. This means that conditions may be detected where the elevator car has travelled from one extremal floor to the opposite extremal floor, i.e. for example from an uppermost floor to a lowermost floor or vice versa. Such travelling may occur in a single entire trip or in several consecutive partial trips. Accordingly, in such case, the elevator car has travelled the maximum possible distance between floors served by the elevator. Upon having detected that the elevator car has travelled such maximum distance, it may be assumed that the elevator car is now positioned at the uppermost floor or the lowermost floor, depending on the travelled direction. Accordingly, under such circumstances, not only relative trip dependent data may be derived but an information about an absolute current position of the elevator car may be derived. Accordingly, this information may be set as an initial car position information.

Subsequent to such setting of the initial car position information, according to a specific implementation of the preceding embodiment, upon each trip of the elevator car, a current position information of the elevator car may be set to one of the number of floors to be served by the elevator based on the initial car position information and based on the trip-dependent data determined since the setting of the initial car position information.

In other words, as soon it is once determined where the elevator car is currently positioned, this initial car position information may subsequently be used, as for any subsequent elevator trip the associated determined relative trip-dependent data allows calculating the new current position of the elevator car.

Accordingly, with embodiments of the method proposed herein, a current car position may be easily tracked and monitored during the operation phase. Beneficially, no initial information about the elevator has to be provided necessarily but, instead, all required information about the elevator may be determined in an automated manner, i.e. without human interaction, and without for example any data exchange with components of an existing elevator. Therein, the number of accessible floors may be learned during the learning phase and an information about the current position of the elevator car may be derived during the operation phase by tracking the elevator trips.

Embodiments of the method proposed herein may be implemented in an elevator monitoring device in accordance with the third aspect of the invention. Accordingly, such elevator monitoring device may acquire a mapping of a number of floors to be served by an elevator and/or may determine relative trip-dependent data relating to elevator car trips during an operation phase. Particularly, the elevator monitoring device may track and monitor current positions of the elevator car during the operation phase. The elevator monitoring device may be a separate device which may be retrofitted to an existing elevator but which does not necessarily require any data connection with components of the existing elevator. For example, the elevator monitoring device may be attached to the elevator car in a retrofitting procedure and may then, during a learning phase, automatically acquire information about the number of floors served by the elevator and, later during an operation phase, automatically provide information about trips and the current position of the elevator car. The elevator monitoring device may comprise at least one sensor such as an acceleration sensor or an air pressure sensor. Furthermore, the elevator monitoring device may comprise some data processing capability such as to process signals from its one or more sensors. Additionally, the elevator monitoring device may comprise some interface for exchanging data or signals with external devices such as an external remote control center. Optionally, the elevator monitoring device may be electrically connected to components of the elevator for establishing an energy supply. Alternatively, the elevator monitoring device may be supplied with electric energy via an own energy source such as a battery.

Embodiments of the proposed method may be implemented using a computer program product. For example, in a programmable elevator monitoring device, computer readable instructions may be executed in a processor such as to perform and/or control the steps of the proposed method. Additionally to the processor, the programmable elevator monitoring device may comprise memory for storing the computer program product and/or storing data acquired during performing the method. Furthermore, the programmable elevator monitoring device may comprise one or more interfaces for exchanging data and/or signals with external devices and/or with humans. For example, an interface may be provided for outputting data representing the mapping of the number of floors and/or data representing determined relative trip-dependent data to external devices located for example in a remote control center. The computer program product may be formulated in any computer language.

The computer program product may be stored on any type of computer readable medium storing computer-readable information in an electric, magnetic, optic or any other manner. For example, the computer readable medium may be a flash memory, a CD, a DVD, a ROM, a PROM, an EPROM, etc. Alternatively, the computer readable medium may be stored on a separate computer or server from which it may be downloaded for example via a network, particularly via the Internet. As a further alternative, the computer readable medium may be stored in various computers or servers forming a cloud.

It shall be noted that possible features and advantages of embodiments of the invention are described herein partly with respect to a method and partly with respect to a device for determining a mapping of a number of floors to be served by an elevator and/or for determining relative trip-dependent data. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to same or similar features.

DETAILED DESCRIPTION

Figure 1:
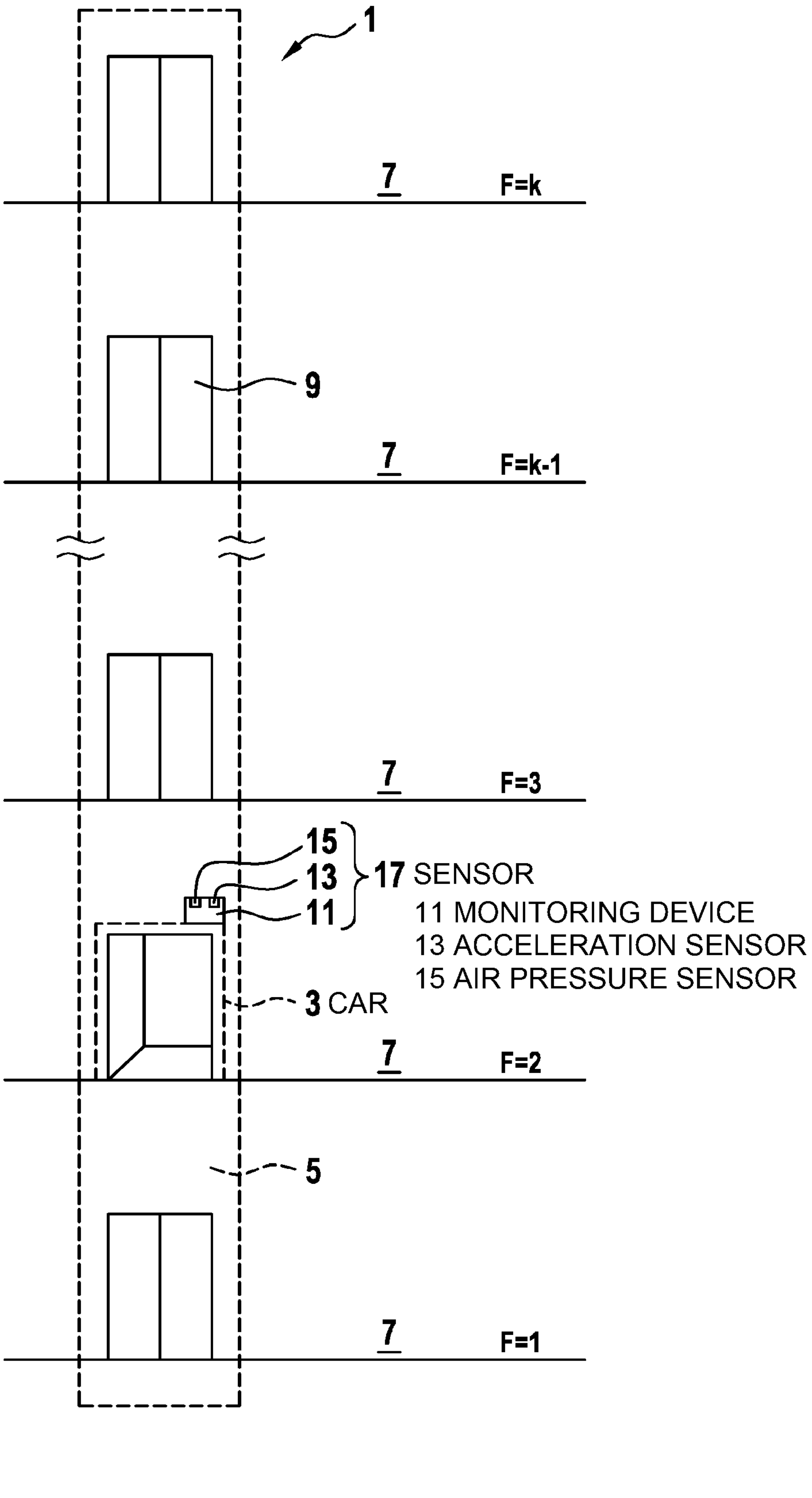
FIG. 1 shows an elevator in which a method according to an embodiment of the present invention may be implemented.

FIG. 1 shows an elevator 1 in which an elevator car 3 may travel along an elevator shaft 5. The elevator car 3 may be stopped at each of a number F of k floors 7 (F=1, 2, 3, . . . , k−1, k) such as to serve all of the k floors 7. Upon opening a corresponding elevator door 9, passengers may enter and exit the elevator car 3 at each of the k floors 7.

A problem to be solved may be seen in obtaining information about characteristics of the elevator 1 and in estimating an absolute floor position of the elevator car 3 during operation of the elevator 1. Particularly, such obtaining of information and estimating of floor positions should be implemented in an automated manner. Preferably, both procedures may be implemented without a necessity of infrastructure deployed on every floor 7.

In order to solve such problem, an approach is proposed in which information about characteristics of the elevator 1 is obtained and an absolute floor position of the elevator car 3 is obtained upon learning and tracking from relative trip-dependent data.

For such purpose, an elevator monitoring device 11 is provided and is mechanically attached to the elevator car 3 such as to be moved throughout the elevator shaft 5 together with the car 3. The elevator monitoring device 11 comprises one or more sensors 17 such as an acceleration sensor 13 and/or an air pressure sensor 15. The sensors 17 are configured for measuring trip-dependent physical parameter values such as e.g. an acceleration acting onto the car 3 and/or an air pressure at the altitude of the car 3. Furthermore, the elevator monitoring device 11 comprises some signal processing capability using a central processing unit and some data memory.

The elevator monitoring device 11 is configured for independently determining a mapping of a number of floors 7 to be served by the elevator 1 such as to obtain the required information about characteristics of the elevator 1 and to obtain information about the absolute floor position of the elevator car 3. For this purpose, the elevator monitoring device 11 may determine trip-dependent physical parameter values obtained from sensors 17, such as e.g. acceleration values obtained from the acceleration sensor 13 and/or air pressure values obtained from the barometric air pressure sensor 15.

The elevator monitoring device 11 is then configured, in a learning phase (sometimes also referred to as training phase), to process the determined trip-dependent physical parameter values by conducting a clustering procedure. Upon clustering the trip-dependent physical parameter values, each of the number of floors 7 in the mapping may be defined. Accordingly, in the learning phase, the number k of floors 7 may be determined.

Furthermore, the elevator monitoring device 11 is configured, in an operation phase, to classify determined trip-dependent physical parameter values to exactly one trip between floors 7 defined in the previously obtained mapping of the number of floors 7 to be served by the elevator 1. As a result of such classification procedure, relative trip-dependent data of the elevator car 3 may be determined from which, upon further processing, information about the current absolute floor position of the elevator car 3 may be derived.

Figure 4:
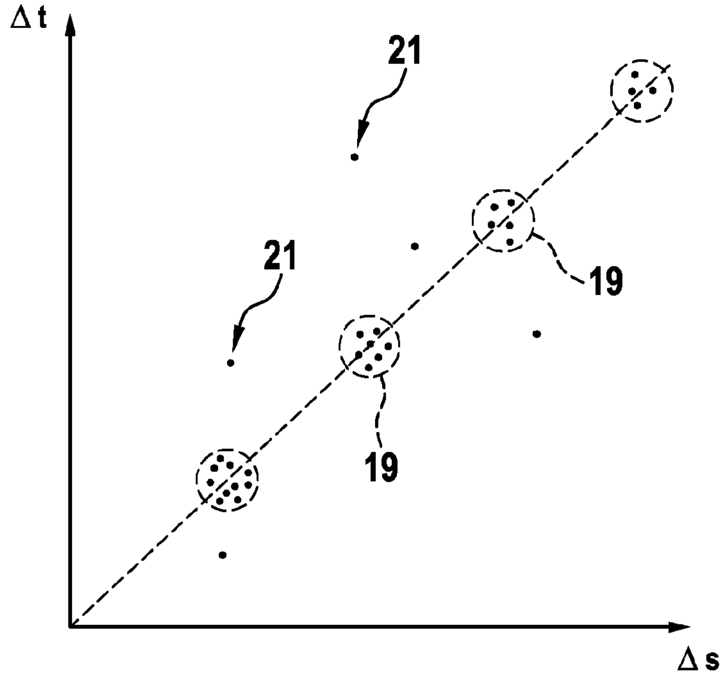
FIG. 4 shows a clustering of measured trip-dependent physical parameter values in the form of trip durations and trip distances for various elevator trips.
Figure 5:
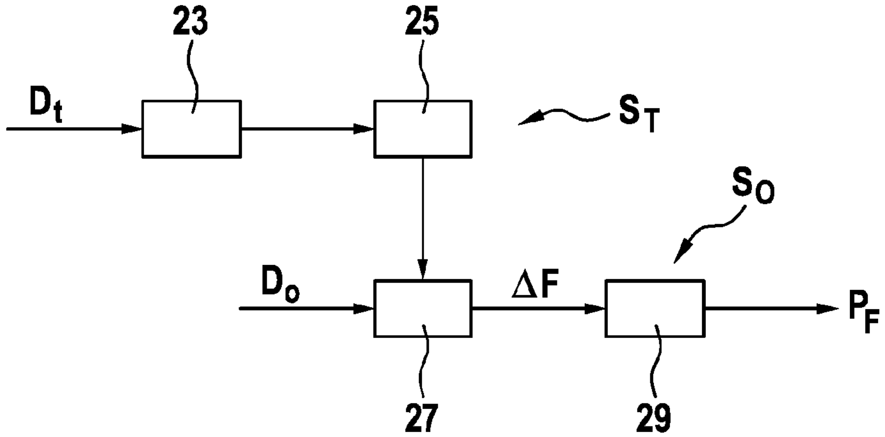
FIG. 5 shows a flow diagram for the method according to an embodiment of the present invention.

Before discussing details of procedures and algorithms to be performed upon implementing the method described herein with respect to FIGS. 5 and 6, an example of the clustering procedure for determining the mapping of the number of floors 7 will be explained with reference to FIGS. 2, 3 and 4.

Figure 2:
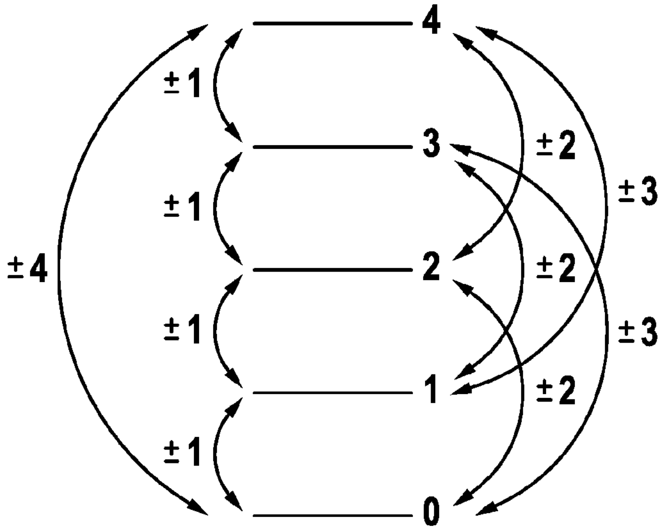
FIG. 2 visualizes various possible trips between floors served by an elevator.

FIG. 2 shows an example in which five floors 7 numbered "0" to "4" are served by an elevator 1. Various types of trips may be travelled by the elevator car 3. For example, short trips indicated as "±1" bring the car 3 from one of the floors 7 to a neighboring floor 7 above or below, i.e. a number ΔF of floors travelled is ±1. Longer trips indicated as "±2", "±3" or "±4" bridge more of the floors 7 in an upwards direction and a downwards direction, respectively, up to a maximum floor distance between the outermost floors.

When travelling such trips, a trip duration Δt and/or a trip distance Δs or trip-dependent physical parameter values unambiguously correlating with such trip duration or trip distance may be determined.

For example, acceleration data provided by the acceleration sensor 13 may be continuously monitored. Upon such acceleration exceeding a predetermined first threshold value or, alternatively, upon such acceleration showing a gradient or a duration exceeding a predetermined first threshold value, the beginning of an elevator trip is detected and a measurement of the trip duration and/or trip distance is started. Such measurement is continued until the end of the elevator trip is detected, e.g. upon the acceleration falling below a second threshold value after exceeding a third threshold value, whereby the second and third threshold values are of opposite sign than the first threshold value. During such measurement, for example the duration Δt of the trip is determined. Alternatively or additionally, the distance Δs of the trip is determined for example by integrating twice the acceleration values obtained from the acceleration sensor 13 during the measurement or by calculating a difference in air pressures measured by the air pressure sensor 15 at the beginning and at the end of the trip.

Figure 3:
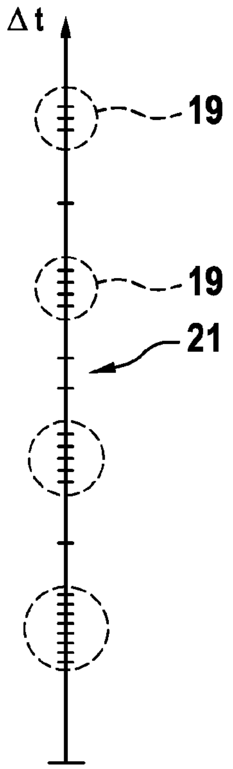
FIG. 3 shows a clustering of measured trip-dependent physical parameter values in the form of trip durations for various elevator trips.

FIG. 3 shows a one-dimensional representation of measured trip durations Δt determined during the learning or training phase. FIG. 4 shows a two-dimensional representation of measured trip durations Δt and corresponding trip distances Δs determined during the learning or training phase. It may be seen that most of the measured duration values (Δt) and duration-distance value pairs (Δt, Δs) are within one of a plurality of clusters 19. A center position of these clusters corresponds approximately to the trip distance (Δt) and the trip distance-duration pair (Δt, Δs) for trips of one of the possible types of trips between floors 7 in the monitored elevator 1. Only a few measurement data do not fall into such clusters 19 and will therefore be treated a noise data 21.

In order to determine the mapping of the number of floors 7 and to finally provide relative trip-dependent data and information about a current position of the elevator car 3, the elevator monitoring device 11 is configured to perform several algorithms including a clustering algorithm, a classification algorithm and a positioner algorithm.

The clustering algorithm is adapted for learning the number k of floors 7 that the elevator serves. The clustering algorithm may rely on density-based clustering (DBSCAN).

The classification algorithm is adapted for estimating the number of floors ΔF travelled by the elevator car 3 during a trip and may be trained on the clustered data.

The positioner algorithm is adapted for tracking the current floor position based on relative trip data.

Details of a possible embodiment of a method according to the present invention shall be described with reference to FIG. 5 and FIG. 6. FIG. 5 and FIG. 6 show exemplary diagrams of the procedure of the entire method and of the positioner phase comprised therein, respectively.

In a training phase $S_T$, the system trains itself before then entering an operation phase $S_O$.

During the training phase $S_T$, the system estimates the number k of floors 7 that the elevator 1 serves from training data $D_t$, i.e. from data from various previous trips over a period T. Such estimation is based on a clustering procedure 23 applied to determined trip-dependent physical parameter values serving as training data $D_t$ such as accelerations values and/or air pressures values. The clustering 23 may be performed using density-based clustering techniques such as DBSCAN. Therein, an up and down travelling direction is not necessarily distinguished, i.e. for example a sign of a trip distance may be ignored. As a result of the clustering, so-called components may be defined. The components are those observations that have been assigned a cluster label, i.e. are not noise. In other words, each cluster 19 is represented by a component.

The clusters 19 are then submitted to a sorting procedure 25. Therein, the clusters 19 may be sorted e.g. in an ascending order of distance travelled so that a cluster label of e.g. "1", "2", etc. represents the number of floors travelled or bridged during a trip.

Subsequently, a classifier 27 is trained based on operation data $D_o$ such that each of future trips may be assigned a distinct cluster number, i.e. a distinct number ΔF of floors travelled. Such classification may be implemented using e.g. Naïve Bayes or k-Nearest Neighbor (KNN) classifiers. Accordingly, each observed trip is assigned to one type of possible trips bridging ΔF floors as represented by the clusters 19, including those data of trips which appear to lie outside of all clusters 19.

Then, in the positioner phase 29, the system follows the movement of the elevator car 3 inside the elevator shaft 5, i.e. tracks the relative trip-dependent data classified based on the determined trip-dependent physical parameter values. Therein, information about the current position of the elevator car 3 may be derived as soon as it is detected that the elevator car 3 has travelled along the entire height of the elevator shaft, i.e. the elevator car 3 has travelled along all of the number k of floors 7 served by the elevator 1. Such travelling should be in a consecutive order and could be in one run or in several stages. If such consecutive travelling along the entire height is observed, the information about the current position $P_F$ of the elevator car 3 may be set to the uppermost floor (F=k) or to the lowermost floor (F=1), depending on whether the travelling direction of the consecutive travel was upwards or downwards. In other words, the position $P_F$ of the car 3 may be locked-in at the highest floor or at the lowest floor, respectively.

Figure 6:
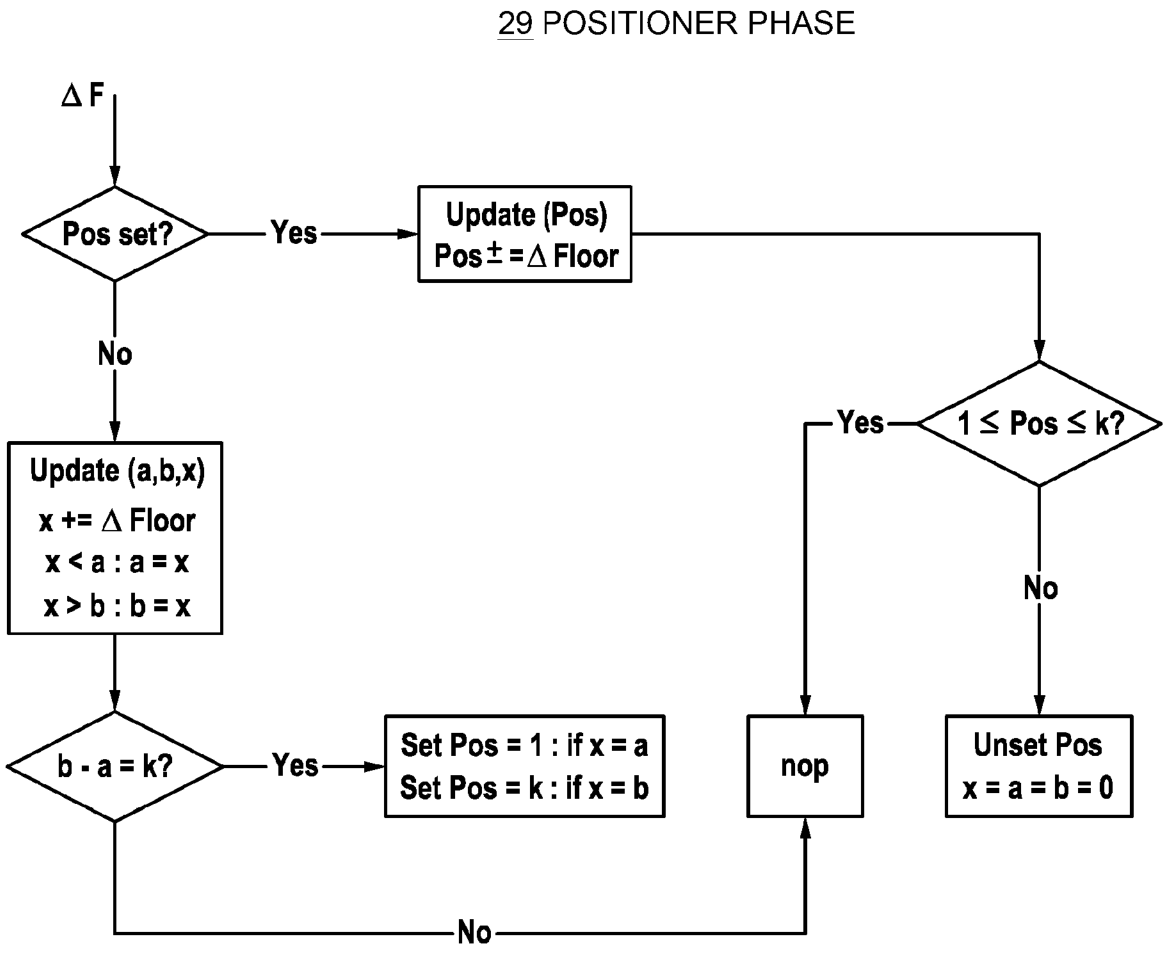
FIG. 6 shows a flow diagram for a positioner phase in a method according to an embodiment of the present invention.

A possible implementation of the positioner phase 29 may be understood from the flow diagram in FIG. 6. The positioner phase 29 is configured to track the position of the car 3 from the number ΔF of floors travelled. It detects when the car 3 has travelled the entire elevator shaft 5 to either the uppermost floor or the lowermost floor and sets its current position accordingly. The indices used in FIG. 6 are as follows: a=lower shaft end, b=upper shaft end, x=current position during search, Pos=car's position inside the shaft, ΔF=number of floors travelled with direction up (+) or down (−), k=number of accessible floors. The algorithm is initialized to "Pos=not" and "x=a=b=0".

For example, at the beginning of the procedure, the starting floor is set to x=0. At that stage, the initial values for the lower shaft end and the upper shaft end are set to a=b=0. Then, in a first trip, the car is displaced e.g. towards the next floor in an upwards direction, i.e. a trip "+1" is travelled. At that stage, the value for the lower shaft end is still a=0, but the values for the upper shaft end as well as for the current floor are set to b=1 and x=1. Then, in a next trip, the car is moved three floors downwards, i.e. a trip "−3" is travelled. At that stage, the value for the lower shaft end is set to a=−2, the value for the upper shaft end stays at b=1 and the value for the current floor is set to b=−2. In the exemplary arrangement of FIG. 2 having five floors, similar processes are repeated preferably until all floors have been travelled to and all types of trips "±1", "±2", "±3" and "±4" have been executed at least once. Then, the operation of the elevator is monitored until a situation is observed where the car 3 has travelled to either the uppermost or the lowermost floor. At that point, the position of the car 3 may be determined on an absolute basis, i.e. it may be determined at which one of the known number of floors the car 3 is currently positioned.

During the operation phase, the system may then track the relative trip-dependent data and update the current position of the car 3 in accordance with such data. The system may read new trip-dependent physical parameter values relating to trip duration and/or trip distance, i.e. a feature vector, and may estimate the number of floors travelled, i.e. classify the feature vector. Furthermore, a direction of up- or down travel may be assigned from the sign of the trip distance measurement. Finally, the positioner algorithm may be updated with the estimated number of floors travelled. Accordingly, the information indicating the current position of the elevator car, i.e. indicating the floor at which the elevator car is currently located, may be continuously updated based on the initially set car position information and taking into account the relative trip-dependent data determined since setting this initial car position information.

It may be noted that, in some extraordinary cases, the positioner algorithm may detect wrong absolute floor estimations. For example, it may be detected that a newly estimated floor position is above the uppermost floor or below the lowermost floor. As such estimation must obviously be wrong, in such situation, the positioner resets itself and waits until the car has reached the lowermost or uppermost floor again and then correctly sets the initial car position information.

Embodiments of the described method may run on a dedicated sensing system or elevator monitoring device 11 inside the elevator 1. Alternatively, the method may be implemented inside a cloud environment which receives trip information such as trip duration and/or trip distance or suitable correlated trip-dependent physical parameter values from a system of sensors 17 in the elevator 1, i.e. in or at the elevator car 3.

Briefly summarized, the method allows to, in a training phase, automatically determining the number of floors served by an elevator and then, in an operation phase, classify each of observed trips and finally detect and track a current position of the elevator car. An elevator monitoring device implementing such method may be retrofitted into existing elevators for e.g. remotely monitoring the elevator operation and does not necessarily require any data transfer between components of the elevator and the elevator monitoring device.

Summarized in an alternative wording, prior art approaches for determining the position of an elevator car 3 generally require infrastructure on every floor 7 such as magnetic or optical flags that uniquely identify each of the floors 7. Alternatively, a sensor based floor estimation using barometric pressure sensors 15 (one pressure sensor being attached to the car 3 and one pressure sensor being arranged at a fixed and known reference height) may be used. As an alternative to such conventional approaches, embodiments of the invention do not need to deploy infrastructure on every floor 7 served by the elevator 1. Furthermore, the proposed solution may be independent of the sensing modality. Additionally, the proposed method may provide a probability value or noise indicator to indicate a level of certainty of the floor estimation. As a result, a set of a priori knowledge may be reduced when deploying sensor hardware. Furthermore, the approach proposed herein may be applied in modernization or new installations where additional sensing hardware is deployed without connection to the elevator shaft information system or to an elevator operation controller.

Finally, it should be noted that the term "comprising" does not exclude other elements or steps and the "a" or "an" does not exclude a plurality. Elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for determining a mapping of a number of floors to be served by an elevator, the method comprising the steps of:

determining, during each of a multiplicity of trips of an elevator car of the elevator, a trip-dependent physical parameter value that depends on at least one of a trip duration and a trip distance of the trips;

measuring the trip-dependent physical parameter value using a measuring device; and clustering the determined trip-dependent physical parameter values to define each of the floors in the mapping.

2. The method according to claim 1 including performing the clustering using a density-based clustering algorithm.

3. The method according to claim 1 wherein the measuring device is an acceleration sensor.

4. The method according to claim 3 wherein a beginning of the at least one of a trip duration and a trip distance is triggered upon a physical parameter value relating to an acceleration measured by the acceleration sensor exceeding a first threshold value and an end of the at least one of a trip duration and a trip distance is triggered upon the physical parameter value relating to the measured acceleration falling below a second threshold value after exceeding a third threshold value.

5. The method according to claim 1 wherein the measuring device is an air pressure sensor.

6. The method according to claim 5 wherein a beginning of the at least one of a trip duration and a trip distance is triggered upon a physical parameter value relating to a gradient of an air pressure measured by the air pressure sensor exceeding a first threshold value and an end of the at least one of a trip duration and a trip distance is triggered upon the physical parameter value relating to the gradient of the measured air pressure falling below a second threshold value.

7. The method according to claim 1 wherein the trip distance physical parameter value is determined by double integration of measured acceleration values during the elevator car trip.

8. The method according to claim 1 wherein the trip distance is determined based upon a pressure difference between air pressures measured at a beginning and at an end of the elevator car trip.

9. The method according to claim 1 wherein a beginning of the at least one of a trip duration and a trip distance is triggered based on a measurement of a first physical parameter value and wherein the trip-dependent physical parameter value is determined based on a measurement of a second physical parameter value.

10. A method for determining relative trip-dependent data of an elevator car, the method comprising the steps of:

determining a trip-dependent physical parameter value that depends on at least one of a trip duration and a trip distance;

classifying the determined trip-dependent physical parameter value to exactly one type of trip between floors defined in a mapping of a number of floors to be served by the elevator, the mapping being determined using a method according to claim 1; and determining the relative trip-dependent data of the elevator car based on the classification.

11. The method according to claim 10 including tracking the relative trip-dependent data to determine whether the elevator car has travelled along all of the number of floors in a consecutive order and setting an initial car position information of the elevator car to one of an uppermost floor and a lowermost floor of the number of floors depending on a travelled direction of the elevator car.

12. The method according to claim 11 wherein, upon each trip of the elevator car, setting a current position information of the elevator car to one of the number of floors to be served by the elevator based on the initial car position information and based on the trip-dependent data determined since the setting of the initial car position information.

13. An elevator monitoring device adapted to perform the method according to claim 1 to determine a mapping of a number of floors to be served by an elevator car of an elevator and/or to determine relative trip-dependent data of the elevator car.

14. The device according to claim 13 including at least one sensor for generating a signal representing the physical parameter value.

15. The device according to claim 14 wherein the at least one sensor is an acceleration sensor or an air pressure sensor.

16. A computer program product comprising computer readable instructions which, when performed by a processor of an elevator monitoring device, instruct the elevator monitoring device to at least one of perform and control the method according to claim 1.

17. A non-transitory computer readable medium comprising the computer program product according to claim 16 stored thereon.

18. A method for determining a mapping of a number of floors to be served by an elevator, the method comprising the steps of:

determining, during each of a multiplicity of trips of an elevator car of the elevator, a trip-dependent physical parameter value that depends on at least one of a trip duration and a trip distance of the trips;

measuring the trip-dependent physical parameter value using an acceleration sensor; and clustering the determined trip-dependent physical parameter values to define each of the floors in the mapping.

19. A method for determining a mapping of a number of floors to be served by an elevator, the method comprising the steps of:

determining, during each of a multiplicity of trips of an elevator car of the elevator, a trip-dependent physical parameter value that depends on at least one of a trip duration and a trip distance of the trips;

measuring the trip-dependent physical parameter value using an air pressure sensor; and clustering the determined trip-dependent physical parameter values to define each of the floors in the mapping.

* * * * *